United States Patent
Govyadinov et al.

(10) Patent No.: US 7,530,696 B2
(45) Date of Patent: May 12, 2009

(54) PROJECTORS AND OPERATION THEREOF

(75) Inventors: Alexander Govyadinov, Corvallis, OR (US); Conor D. Kelly, Corvallis, OR (US); Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 489 days.

(21) Appl. No.: 11/352,764

(22) Filed: Feb. 13, 2006

(65) Prior Publication Data

US 2007/0188720 A1 Aug. 16, 2007

(51) Int. Cl.
G03B 21/26 (2006.01)
(52) U.S. Cl. .......................... 353/94; 353/121; 359/290; 359/291
(58) Field of Classification Search .................. 353/94, 353/121, 30, 37, 48, 50, 51, 85, 86, 87, 98, 353/99; 359/247, 290, 291, 577, 578, 579
See application file for complete search history.

(56) References Cited

U.S. PATENT DOCUMENTS

| | | | |
|---|---|---|---|
| 4,403,248 A | 9/1983 | Te Velde | |
| 5,311,360 A | 5/1994 | Bloom et al. | |
| 5,537,258 A | 7/1996 | Yamazaki et al. | |
| 5,636,052 A * | 6/1997 | Arney et al. | 359/291 |
| 6,466,354 B1 * | 10/2002 | Gudeman | 359/247 |
| 6,552,842 B2 * | 4/2003 | Simpson et al. | 359/318 |
| 6,650,460 B2 | 11/2003 | Kurematsu | |
| 6,674,562 B1 * | 1/2004 | Miles | 359/291 |
| 6,999,225 B2 * | 2/2006 | Lin et al. | 359/291 |
| 7,025,461 B2 * | 4/2006 | Veligdan et al. | 353/37 |
| 7,113,339 B2 * | 9/2006 | Taguchi et al. | 359/586 |
| 7,147,331 B2 * | 12/2006 | Yamazaki et al. | 353/31 |
| 7,165,845 B2 * | 1/2007 | Takeda et al. | 353/31 |
| 7,207,677 B2 * | 4/2007 | Takeda et al. | 353/31 |
| 7,307,776 B2 * | 12/2007 | Tsai et al. | 359/291 |
| 7,319,552 B2 * | 1/2008 | McKinnell et al. | 359/291 |
| 7,325,929 B2 * | 2/2008 | Yavid et al. | 353/31 |
| 7,342,709 B2 * | 3/2008 | Lin | 359/290 |
| 7,447,891 B2 * | 11/2008 | Faase et al. | 713/1 |
| 7,471,444 B2 * | 12/2008 | Miles | 359/291 |
| 2002/0015215 A1 | 2/2002 | Miles | |
| 2002/0024711 A1 | 2/2002 | Miles | |
| 2002/0149584 A1 | 10/2002 | Simpson et al. | |
| 2003/0025981 A1 | 2/2003 | Ishikawa et al. | |
| 2003/0067590 A1 * | 4/2003 | Shin | 353/99 |
| 2003/0218794 A1 * | 11/2003 | Takeda et al. | 359/292 |
| 2004/0217919 A1 | 11/2004 | Piehl et al. | |
| 2004/0218251 A1 | 11/2004 | Piehl et al. | |
| 2005/0007563 A1 * | 1/2005 | Yamazaki et al. | 353/98 |
| 2005/0083565 A1 | 4/2005 | Yamazaki et al. | |
| 2005/0195138 A1 | 9/2005 | Anderson et al. | |
| 2006/0023176 A1 | 2/2006 | Lerner | |
| 2006/0192924 A1 * | 8/2006 | Seki et al. | 353/85 |
| 2006/0274288 A1 * | 12/2006 | Conner | 353/94 |
| 2007/0206269 A1 * | 9/2007 | Martin | 359/291 |
| 2008/0084511 A1 * | 4/2008 | Moizio et al. | 348/789 |

* cited by examiner

*Primary Examiner*—William C Dowling
*Assistant Examiner*—Bao-Luan Le

(57) ABSTRACT

At least first and second narrowband beams of light, respectively of different wavelengths, are concurrently directed onto a modulator respectively at first and second angles of incidence.

19 Claims, 7 Drawing Sheets

PROJECTORS AND OPERATION THEREOF

BACKGROUND

Digital projectors often include micro-displays that include arrays of pixels. Each pixel may include a liquid crystal on silicon (LCOS) device, an interference-based modulator, etc. A micro-display is used with a light source and projection lens of the digital projector, where the projection lens images and magnifies the micro-display. The micro-display receives light from the light source. When the pixels of the micro-display are ON, the pixels direct the light to the projection lens. When the pixels are OFF, they produce a "black" state.

Some interference-based modulators, such as Fabry-Perot modulators, include a total reflector and a partial reflector separated by a gap, such as an air-containing gap, that can be adjusted by moving the total and partial reflectors relative to each other. Interference-based modulators are typically "rail-to-rail" devices, meaning they have two stable positions ON and OFF, corresponding to different gap settings. To implement a color display using interference-based modulators and a multi-colored light source, such as a red, blue, and green light source, a separate interference-based modulator is commonly used for each color. However, this results in complicated optics, e.g., including several filters, reflectors, lenses, etc., and is not cost effective.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
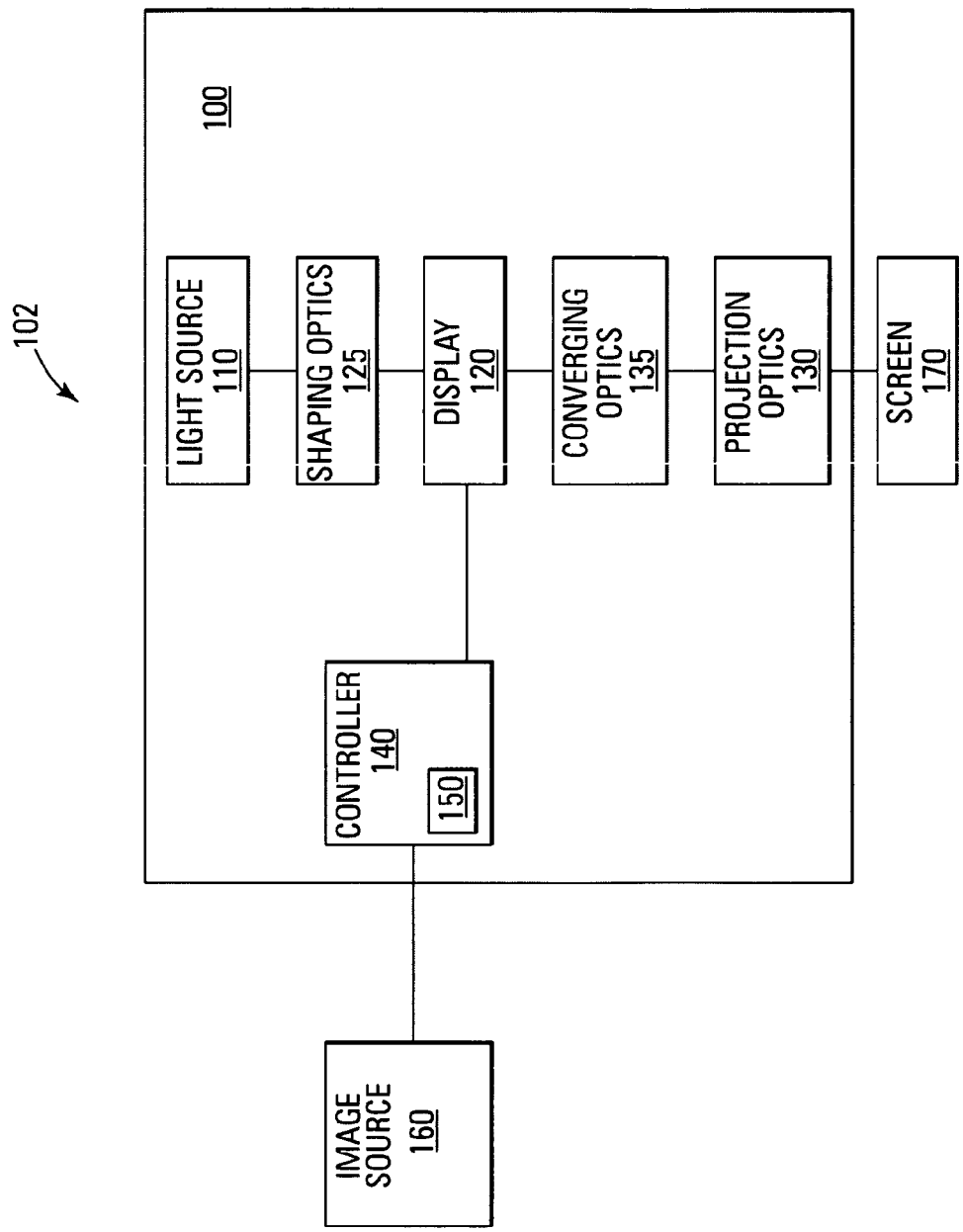
FIG. 1 is a block diagram of an embodiment of a digital projector, according to an embodiment of the invention.

FIG. 1 is a block diagram of a digital projector 100, e.g., as a portion of a rear or front projection system 102, such as a rear or front projection television, according to an embodiment. Digital projector 100 includes a light source 110 and a micro-display 120 that may include pixilated MEMS devices, such as one or more arrays of pixilated interference-based modulators, e.g., Fabry-Perot modulators, with each interference-based modulator corresponding to a pixel of the array. For one embodiment, light source 110 may be a multi-colored source that can produce red, green, and blue light beams, magenta and green light beams, etc. For another embodiment, light source 110 directs different colors of light respectively at different angles of incidence onto the modulators of micro-display 120 concurrently. For another embodiment, light source 110 may include a first laser for producing a beam of first-colored light, a second laser for producing a beam of second-colored light, etc. Alternatively, for other embodiments, light source 110 may include different colored light-emitting diodes (LEDs).

For one embodiment, shaping (or illumination) optics 125 may be disposed between light source 110 and the modulators of micro-display 120. Shaping optics 125 may include a beam expander and a scattering device. Shaping optics 125 transfer beams of light from light source 110 to display 120 at the appropriate size and numerical aperture and may act to diffuse the different colored light beams to produce less coherent light than is normally produced by lasers. For one embodiment, the shaping optics may include a lenses for beam expanding and a movable ground-glass plate for scattering light or a scattering plate for each colored light beam to pass through.

Projection optics 130 are also included. Projection optics 130 may include a refractor, such as a transparent plate or a lens (not shown in FIG. 1) optically coupled to the modulators of micro-display 120 for front or rear projection embodiments or at least a mirror (not shown in FIG. 1) optically coupled to the modulators of micro-display 120 for front or rear projection embodiments. For some embodiments, projection assembly 130 may include a magnifying lens, color correction filter(s), etc. For one embodiment, the refractor or mirror may be located at a center of the magnifying lens.

For other embodiments, converging optics 135 may be disposed between the modulators of micro-display 120 and projection optics 130. For one embodiment, the different colored beams of light are respectively reflected off the modulators, when in the ON state, and onto converging optics 135 at different angles. Converging optics 135 act to output the different colors at substantially the same angle onto a projection screen 170 that may be a front or rear projection screen. Alternatively, for other embodiments, converging optics 135 may be integrated into the modulators of micro-display 120. For one embodiment, converging optics may include one or more prism combiners, dichroic beam combiners (or mixers), or diffraction gratings, e.g., blazed or non-blazed diffraction gratings, transmission diffraction gratings, concave diffraction gratings, or the like.

Projector 100 also includes a controller 140 for controlling the operation of micro-display 120. For one embodiment, controller 140 controls the modulation of each of the pixilated interference-based modulators of the one or more arrays of modulators of micro-display 120. For another embodiment, controller 140 is adapted to perform methods in accordance with embodiments of the present disclosure in response to computer-readable instructions. These computer-readable instructions are stored on a computer-usable media 150 of controller 140 and may be in the form of software, firmware, or hardware. In a hardware solution, the instructions are hard coded as part of a processor, e.g., an application-specific integrated circuit (ASIC) chip, a field programmable gate array (FPGA), etc. In a software or firmware solution, the instructions are stored for retrieval by controller 140. Some additional examples of computer-usable media include static or dynamic random access memory (SRAM or DRAM), read-only memory (ROM), electrically-erasable programmable ROM (EEPROM or flash memory), magnetic media and optical media, whether permanent or removable. Controller 140 receives digital source data, for example, from an image source 160, such as a computer, DVD player, a set-top box connected to a direct television satellite link, cable television provider, etc.

Figure 2:
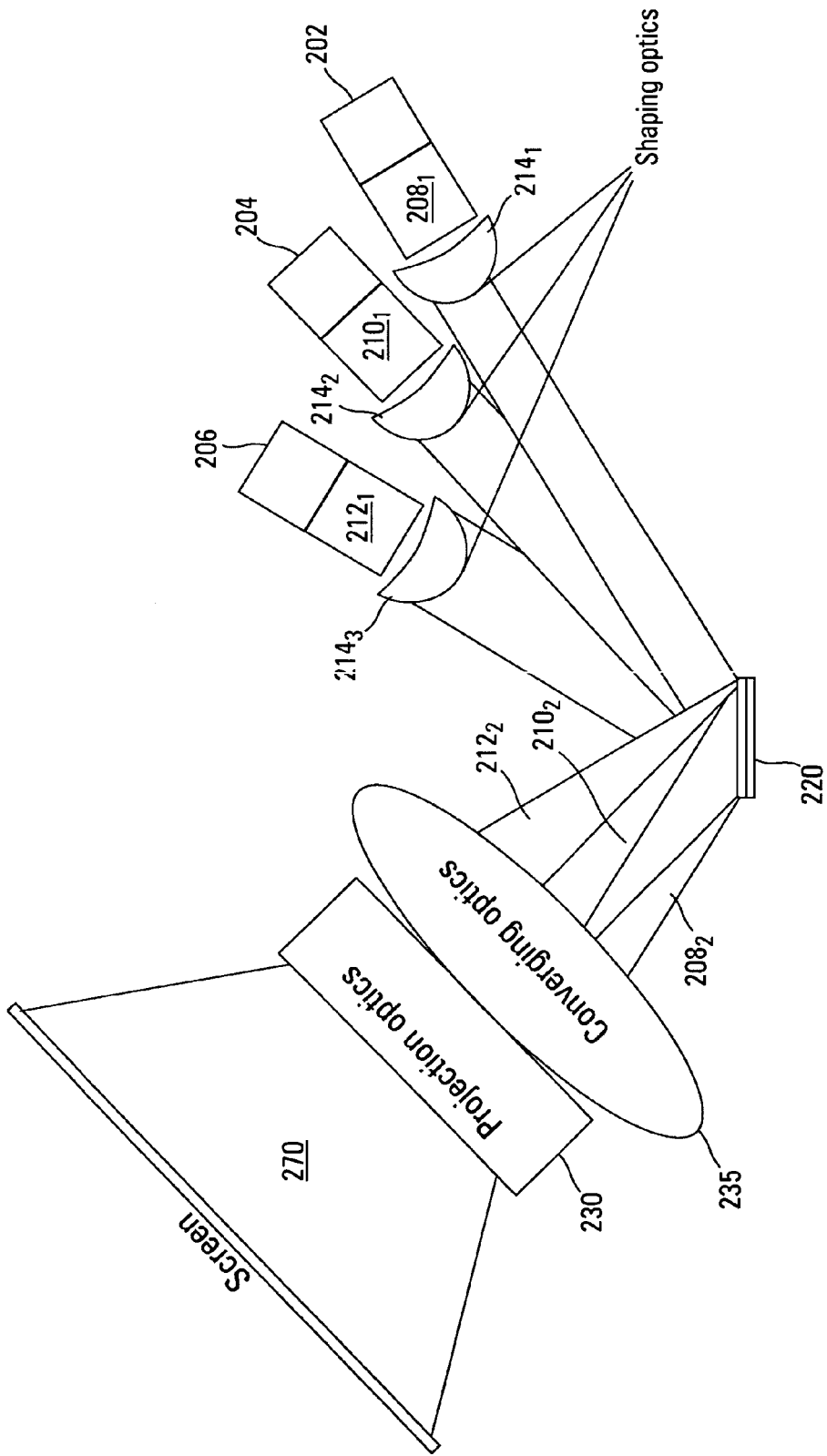
FIG. 2 is a pictorial illustration of an embodiment of a projector, according to another embodiment of the invention.

FIG. 2 is a pictorial illustration of a portion of a projector, such as projector 100, according to another embodiment. Light sources 202, 204, and 206 respectively generate narrowband beams $208_1$, $210_1$, and $212_1$ of different colors, such as red, green, and blue. For one embodiment, the bandwidth of each beams $208_1$, $210_1$, and $212_1$ is sufficiently narrow so that the bandwidths of beams $208_1$, $210_1$, and $212_1$ do not overlap each other. For another embodiment, light sources 202, 204, and 206 may be lasers for producing the sufficiently narrow bandwidths. Alternatively, for some embodiments, light sources 202, 204, and 206 may be LEDs configured to produce the sufficiently narrow bandwidths. For other embodiments, this may be accomplished by filtering portions of the LED bandwidths such that the beams produced thereby do not overlap. For one embodiment, light sources 202, 204, and 206 may be contained in a single unit, such as light source 110 of FIG. 1.

For one embodiment, beams $208_1$, $210_1$, and $212_1$ are respectively directed through shaping optics $214_1$, $214_2$, and $214_3$, such as lenses. After passing through shaping optics 214, light beams $208_1$, $210_1$, and $212_1$ are respectively directed onto a surface of a modulator 220 at different incident angles to a perpendicular to modulator 220. For one embodiment, light beams $208_1$, $210_1$, and $212_1$ are narrowband beams of light. For one embodiment, modulator 220 is an interference-based modulator, e.g., Fabry-Perot modulator, and may represent a single pixel or an array of pixels of micro-display 120 of FIG. 1. When modulator 220 is in the ON (or a reflective) state, modulator 220 reflects un-modulated beams $208_1$, $210_1$, and $212_1$ to respectively produce modulated beams $208_2$, $210_2$, and $212_2$ that are directed through converging optics 235, through projection optics 230, and onto a screen 270.

Figure 3:
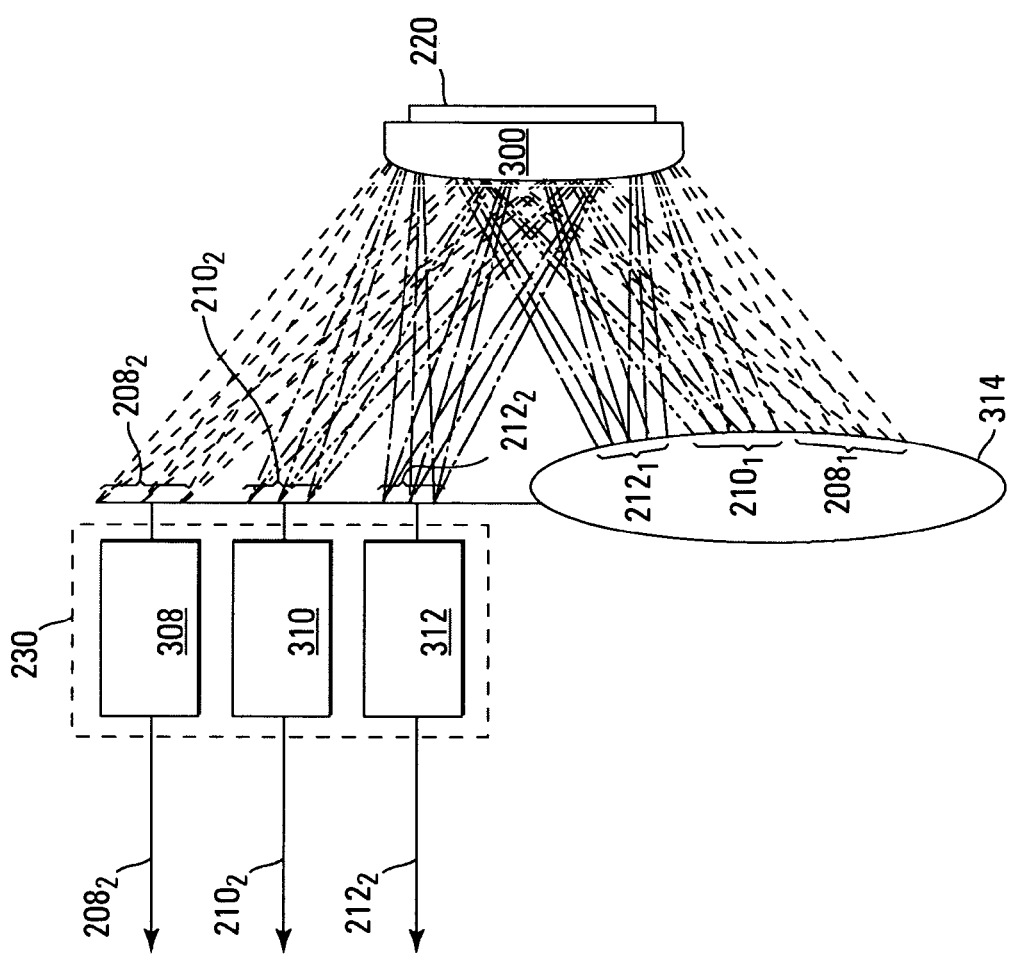
FIG. 3 illustrates a portion of an embodiment of a projector, according to another embodiment of the invention.

FIG. 3 illustrates a portion of a projector, such as projector 100, according to another embodiment. Common reference numbers denote similar elements in FIGS. 2 and 3. After passing through an illumination lens (or shaping optics) 314, light beams $208_1$, $210_1$, and $212_1$ are directed to a lens 300, e.g., a field lens, such as a telecentric lens, located between illumination lens 314 and modulator 220. For one embodiment, lens 300 may be integrated in modulator 220. Note that light beams $208_1$ are incident on lens 300 at different angles, as are light beams $210_1$, and light beams $212_1$. Lens 300 acts to produce light beams $208_1$ that are telecentric or at the same incident angle at each pixel of modulator 220, and similarly for light beams $210_1$ and light beams $212_1$. That is, the angle (or range of angles) for each wavelength does not change as a function of position on the modulator. For one embodiment each of the light beams exiting the modulator has a numerical aperture of about 0.05 to achieve a desired resolution.

When modulator 220 is in the ON state modulated beams $208_2$, $210_2$, and $212_2$, respectively corresponding to un-modulated beams $208_1$, $210_1$, and $212_1$, are output from modulator 220, and are respectively directed to projection lenses 308, 310, and 312 of projection optics 230 after passing through lens 300. For one embodiment, modulated beams $208_2$, $210_2$, and $212_2$ pass through converging optics, such as converging optics 235 of FIG. 2 or converging optics 135 of FIG. 1, that are integrated in modulator 220 (not shown in FIG. 3) before being directed to projection lenses 308, 310, and 312 of projection optics 230. For another embodiment, lenses 308, 310, and 312 direct the light such that it converges at a projection screen, such as projection screen 170 of FIG. 1 or projection screen 270 of FIG. 2. For one embodiment, lenses 308, 310, and 312 may include turning mirrors, prisms, diffractive elements, etc. for causing the light to converge. For another embodiment, lenses 308, 310, and 312 oriented such that the light converges.

Figure 4:
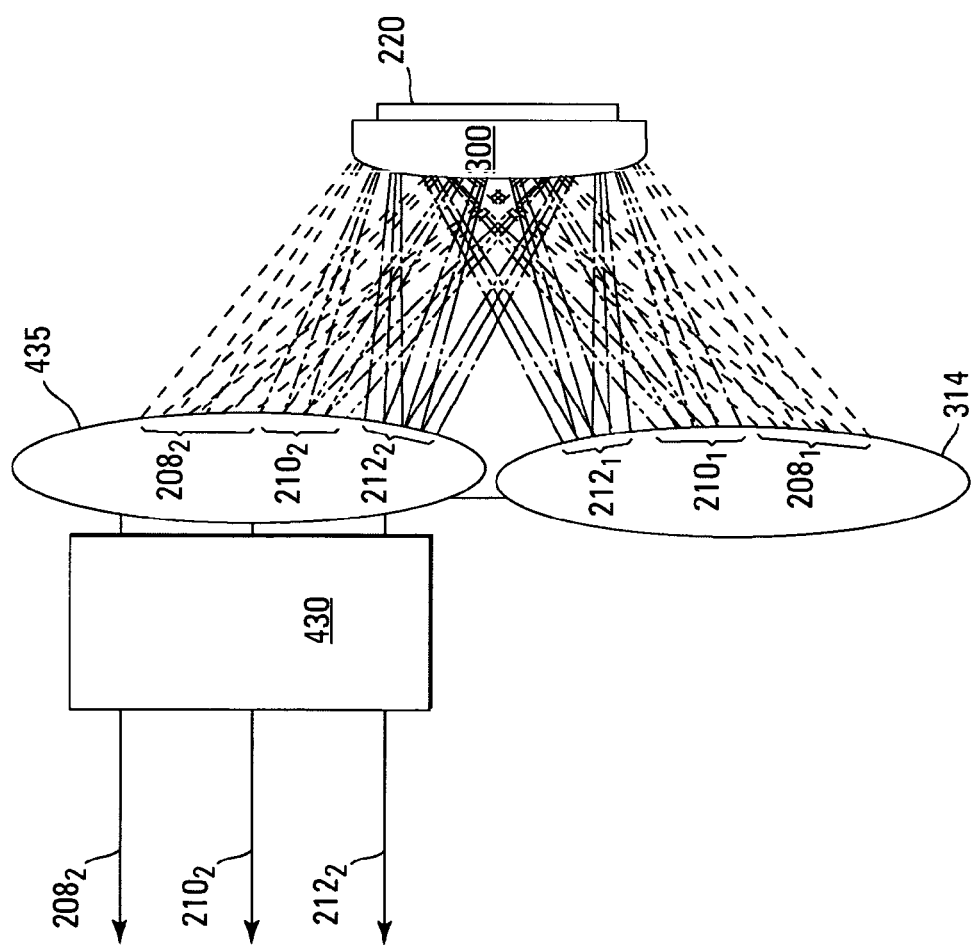
FIG. 4 illustrates a portion of an embodiment of a projector, according to another embodiment of the invention.

FIG. 4 illustrates a portion of a projector, such as projector 100, according to another embodiment. Common reference numbers denote similar elements in FIGS. 3 and 4. When modulator 220 is in the ON state, modulator 220 reflects un-modulated beams $208_1$, $210_1$, and $212_1$ to respectively produce modulated beams $208_2$, $210_2$, and $212_2$ that are directed to converging optics 435, as shown in FIG. 4, that act to converge modulated beams $208_2$, $210_2$, and $212_2$ onto a projection lens 430. Projection lens 430 directs the converged, modulated beams $208_2$, $210_2$, and $212_2$ onto a onto a projection screen, such as projection screen 170 of FIG. 1 or projection screen 270 of FIG. 2.

Figure 5:
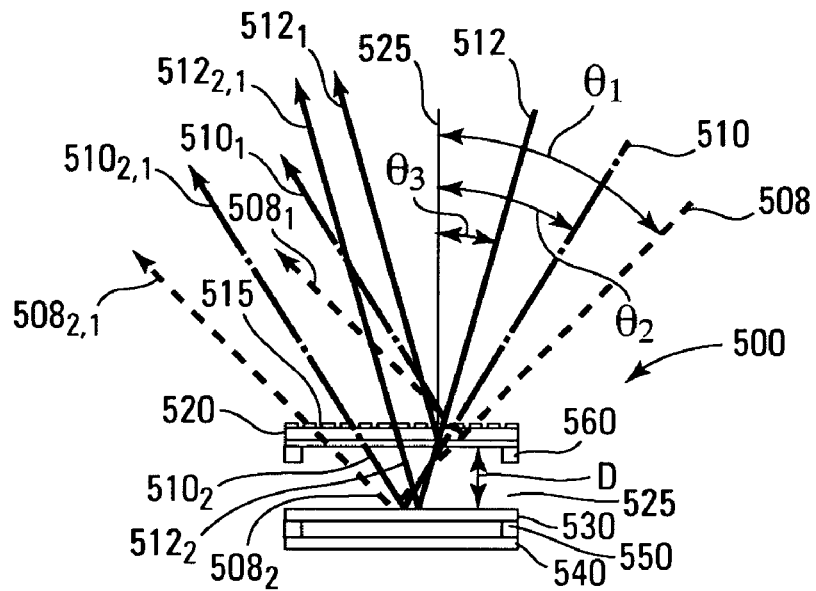
FIG. 5 illustrates an embodiment of a modulator in an ON state, according to another embodiment of the invention.

FIG. 5 illustrates a modulator 500, such as a single pixel of display 120 of FIG. 1, in an ON (or reflective) state, according to another embodiment. For one embodiment, modulator 500 is an interference-based modulator, e.g., a Fabry-Perot modulator. Light beams 508, 510, and 512, respectively of different wavelengths, e.g., colors, such as red, green, and blue, but not limited thereto, are incident on an upper surface 515 of a partial reflector 520 of modulator 500 respectively at incident angles of $\theta_1$, $\theta_2$, and $\theta_3$ clockwise from a normal 525 to surface 505 of partial reflector 510. Note that negative values of incident angles $\theta_1$, $\theta_2$, and $\theta_3$ (e.g., $-\theta_1$, $-\theta_2$, and $-\theta_3$) are counterclockwise from a normal 525.

Portions $508_1$, $510_1$, and $512_1$ respectively of beams 508, 510, and 512 are reflected off upper surface 515 of partial reflector 520. Remaining portions $508_2$, $510_2$, and $512_2$ respectively of beams 508, 510, and 512 pass through partial reflector 510, through a gap 525, and are reflected off a total reflector 530 back to partial reflector 520 through gap 525, as shown in FIG. 5. Portions $508_{2,1}$, $510_{2,1}$, and $512_{2,1}$ respectively of beam portions $508_2$, $510_2$, and $512_2$ pass back through partial reflector 520, while remaining portions (not show in FIG. 5) of beam portions $508_2$, $510_2$, and $512_2$ are reflected off partial reflector 520, back through gap 525 to total reflector 530, and so on. The light beam portions $508_{2,1}$, $510_{2,1}$, and $512_{2,1}$ and other beams that pass through partial reflector 520, after being reflected from total reflector 530, destructively interfere with beam portions $508_1$, $510_1$, and $512_1$ incoming beams 508, 510, and 512 to produce a reflective (or the ON) state of modulator 500.

For one embodiment, gap 525 contains a gas, such as air or an inert gas (argon, etc.) or a vacuum. For another embodiment, total reflector 530 is movable relative to partial reflector 520 (e.g., may be mounted on flexures as is known in the art) for adjusting the size D of gap 525. For some embodiments, a driver 540, such as a capacitor, adjusts a gap 525 by moving total reflector 530. Alternatively, for another embodiment, the size D of gap 525 may be adjusted by moving partial reflector 520 while total reflector 530 is stationary.

Figure 6:
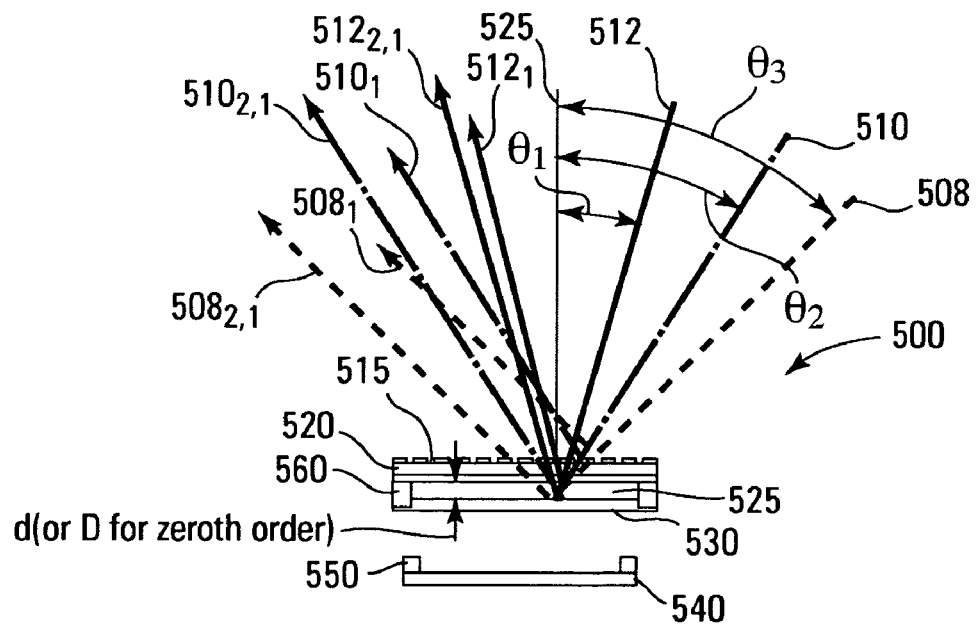
FIG. 6 illustrates an embodiment of a modulator in an OFF state, according to another embodiment of the invention.

FIG. 6 illustrates modulator 500 in an OFF (or "black" or absorptive state), according to another embodiment. Common reference numbers denote similar or the same elements in FIGS. 5 and 6. To obtain the OFF state, gap 525 is set to a gap size d. Setting gap 525 to gap size d causes constructive interference between light beam portions $508_{2,1}$, $510_{2,1}$, and $512_{2,1}$ and beam portions $508_1$, $510_1$, and $512_1$ and incoming beams 508, 510, and 512 to produce the black (or OFF) state of modulator 500. Thus, gap size d produces a spectrally selective black state for the wavelengths respectively corresponding to beams 508, 510, and 512. As discussed below, for one embodiment, a black state may also be obtained at for zeroth order standing light waves in gap 525 and the gap size D, where gap size D is on the order of zero.

For one embodiment, bumps (or stops) 550 may be formed on or protrude from driver 540 and act to set the gap size D, as shown in FIG. 5. For another embodiment, bumps (or stops) 560 may be formed on or protrude from partial reflector 520 and act to set the gap size d, as shown in FIG. 6.

Following are relationships for the gap sizes D and d:

$$D=(m_1\lambda_1\cos\theta_1)/2n=(m_2\lambda_2\cos\theta_2)/2n=(m_3\lambda_3\cos\theta_3)/2n \quad (1)$$

and $$d=(m_1\lambda_1\cos\theta_1)/4n=(m_2\lambda_2\cos\theta_2)/4n=(m_3\lambda_3\cos\theta_3)/4n \quad (2)$$

where $\lambda_1$, $\lambda_2$, and $\lambda_3$ are the wavelengths respectively corresponding to incident light beams 508, 510, and 512 of FIGS. 5 and 6, $m_1$, $m_2$, and $m_3$ are the orders (or harmonics) of standing light waves within gap 525 of FIGS. 5 and 6 respectively for the wavelengths $\lambda_1$, $\lambda_2$, and $\lambda_3$ ($m_1$, $m_2$, and $m_3$=0, 1, 2, 3, ..., N for equation (1) and $m_1$, $m_2$, and $m_3$=1, 2, 3, ..., N for equation (2)), $\theta_1$, $\theta_2$, and $\theta_3$ are respectively the incidence angles of light beams 508, 510, and 512 of FIGS. 5 and 6 with respect to the normal 525, $-90°<\theta_1$, $\theta_2$, and $\theta_3<90°$, and n is the index of refraction of the contents of gap 525, n=1 for air.

Note that equation (1) and equation (2) respectively correspond to the destructive-interference ON state of FIG. 5 and the constructive-interference OFF state of FIG. 6 for non-zero values of $m_1$, $m_2$, and $m_3$. However, as indicated above, a black state may also be obtained for the zeroth order, i.e., $m_1=m_2=m_3=0$, for gap size D from equation (1) for all wavelengths.

Figure 7:
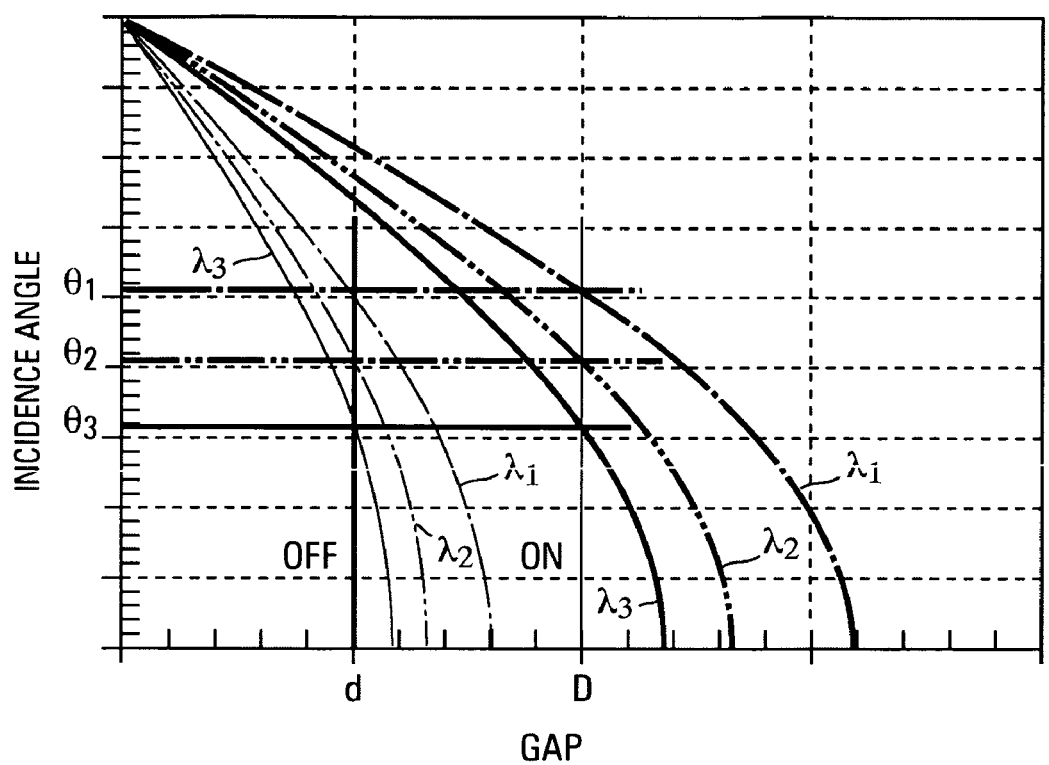
FIG. 7 is an exemplary plot of incidence angle of light on a modulator versus gap size for fixed orders, according to another embodiment of the invention.

For one embodiment, incidence angles $\theta_1$, $\theta_2$, and $\theta_3$ can be determined to give the same order for each wavelength $\lambda_1$, $\lambda_2$, or $\lambda_3$, (or colored light), i.e., $m_1=m_2=m_3$, for single gap sizes D and d. This is illustrated, for example, in the incidence angle versus gap size plot in FIG. 7, according to another embodiment, for wavelengths $\lambda_1$, $\lambda_2$, and $\lambda_3$. For one example, $\theta_1=\pm51°$, $\theta_2=\pm41°$, and $\theta_3=\pm32°$ gives $m_1=m_2=m_3=1$ respectively for $\lambda_1$=640 nanometers (red), $\lambda_2$=532 nanometers (green), and $\lambda_3$=470 nanometers (blue) for a gap size D=200 nanometers, a gap size d=100 nanometers, and n=1 for air.

Note that by setting the incident angles for each of beams 508, 510, and 512 (FIGS. 5 and 6), ON and OFF states are achieved for each wavelength (or of different-colored light) respectively for a single gap size D and a single gap size d. In this way, a modulator corresponding to a single pixel can receive different colored light beams concurrently and produce ON or OFF states for each light beam concurrently. Note further that standing light waves respectively corresponding to the different light beams are of same order (or harmonic) within the gap.

Figure 8:
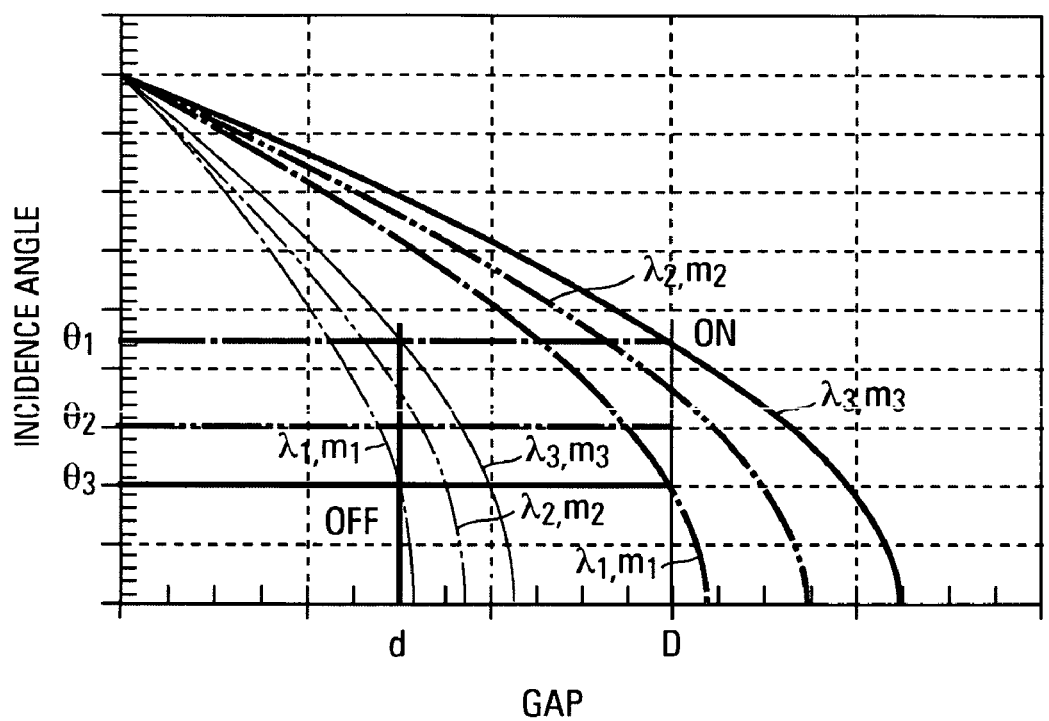
FIG. 8 is an exemplary plot of incidence angle of light on a modulator versus gap size for different orders, according to another embodiment of the invention.

For another embodiment, incidence angles $\theta_1$, $\theta_2$, and $\theta_3$ can be determined to give different orders for each wavelength $\lambda_1$, $\lambda_2$, or $\lambda_3$ (or colored light) for single gap sizes D and d. This is illustrated, for example, in the incidence angle versus gap size plot in FIG. 8, according to another embodiment, for wavelengths $\lambda_1$, $\lambda_2$, and $\lambda_3$ and gap sizes D and d. For one example, $\theta_1=\pm20°$, $\theta_2=\pm36°$, and $\theta_3=\pm45°$ gives $m_1=5$, $m_2=7$, and $m_3=9$ respectively for $\lambda_1$=640 nanometers (red), $\lambda_2$=532 nanometers (green), and $\lambda_3$=470 nanometers (blue) for a gap size D=1500 nanometers and a gap size d=700 nanometers and n=1 for air. Note that the ON (or reflective) and OFF (or absorptive) states are respectively produced for each wavelength for a single gap width D and a single gap width d, as described above. Note further that the ON state is achieved by the standing waves of light beams respectively corresponding to the different wavelengths concurrently being of different orders (or harmonics), as is the OFF state.

As demonstrated above, embodiments of the invention use different incidence angles to achieve the same ON state and the same OFF state for wavelengths $\lambda_1$, $\lambda_2$, and $\lambda_3$ respectively for fixed gap sizes D and d, as opposed to conventional methods that achieve this by using different gap sizes for wavelengths of light at fixed incidence angles. In this way, embodiments of the invention can use a modulator corresponding to a single pixel for different colored light beams concurrently.

Conclusion

Although specific embodiments have been illustrated and described herein it is manifestly intended that the scope of the claimed subject matter be limited only by the following claims and equivalents thereof.

What is claimed is:

1. A method of operating a projector, comprising: concurrently directing at least first and second narrowband beams of light, respectively of different wavelengths, onto a modulator respectively at first and second angles of incidence; wherein said first and second angles of incidence are selected so that a single size of a gap between total and partial reflectors of the modulator produces substantially a same reflective or absorptive state for the first and second beams.

2. The method of claim 1 further comprising directing at least a third beam of light onto the modulator at a third angle of incidence concurrently with the first and second beams of light, the at least third beam of light having a wavelength different than the wavelengths of the at least first and second beams of light, wherein the third angle of incidence is selected so that the single size of the gap produces substantially the same reflective or absorptive state for the at least third beam as for the first and second beams.

3. The method of claim 1, wherein the at least first and second beams of light have a same order within the gap.

4. The method of claim 1, wherein the at least first and second beams of light have different orders within the gap.

5. The method of claim 1 further comprising converging reflections of the at least first and second beams from the modulator.

6. The method of claim 1 further comprising shaping the at least first and second beams of light before directing them onto the modulator.

7. The method of claim 1, wherein the at least first and second beams of light respectively at the first and second angles of incidence are telecentric beams of light.

8. The method of claim 1 further comprising selecting a size of the gap between total and partial reflectors of the modulator to produce substantially the same reflective state for the at least first and second beams.

9. The method of claim 8 further comprising selecting another size of the gap between total and partial reflectors to produce substantially the same absorptive state for the at least first and second beams.

10. A projector, comprising: means for concurrently directing incoming first and second beams of light, respectively of different wavelengths, onto a modulator respectively at first and second angles of incidence; and means for selecting a gap size between total and partial reflectors of the modulator to produce substantially a same reflective or absorptive state for the first and second beams.

11. The projector of claim 10 further comprising means for directing a third beam of light onto the modulator at a third angle of incidence concurrently with the first and second beams of light, the third beam of light having a wavelength different than the wavelengths of the first and second beams of light, wherein the gap size between the total and partial reflectors is further selected to produce substantially the same reflective or absorptive state for the third beam as for the first and second beams.

12. A projector, comprising: a light source configured to direct first and second beams of light, respectively at different wavelengths, onto a modulator at respectively first and second angles of incidence the modulator comprising: a partial reflector; a total reflector; and a selectively adjustable gap interposed between the partial and total reflectors; wherein the first and second angles of incidence are selected so that a selected first size of the gap produces substantially a same reflective state for the first and second beams and a selected second size of the gap produces substantially a same absorptive state for the first and second beams.

13. The projector of claim 12, wherein light source is further configured to direct a third beam of light, at a different wavelength than the wavelengths of the first and second beams, onto the modulator at a third angle of incidence.

14. The projector of claim 13, wherein the third angle of incidence is selected so that the selected first and second sizes of the gap respectively produce substantially the same reflective state for the third beam as for the first and second beams and substantially the same absorptive state for the third beam as for the first and second beams.

15. The projector of claim 12 further comprising shaping optics interposed between the light source and the modulator.

16. The projector of claim 15 further comprising a field lens interposed between the shaping optics and the modulator.

17. The projector of claim 12, wherein the light source comprises first and second lasers or first and second light-emitting diodes for respectively producing the first and second beams of light.

18. The projector of claim 12 further comprising converging optics interposed between the modulator and projection optics of the projector.

19. The projector of claim 18, wherein the converging optics are integrated in the modulator.

* * * * *

UNITED STATES PATENT AND TRADEMARK OFFICE
CERTIFICATE OF CORRECTION

PATENT NO. : 7,530,696 B2
APPLICATION NO. : 11/352764
DATED : May 12, 2009
INVENTOR(S) : Alexander Govyadinov et al.

It is certified that error appears in the above-identified patent and that said Letters Patent is hereby corrected as shown below:

In column 4, line 58, after "adjusts" delete "a".

In column 4, line 64, delete "elments" and insert -- elements --, therefor.

Signed and Sealed this

Twenty-second Day of September, 2009

David J. Kappos
*Director of the United States Patent and Trademark Office*